Figure 7:
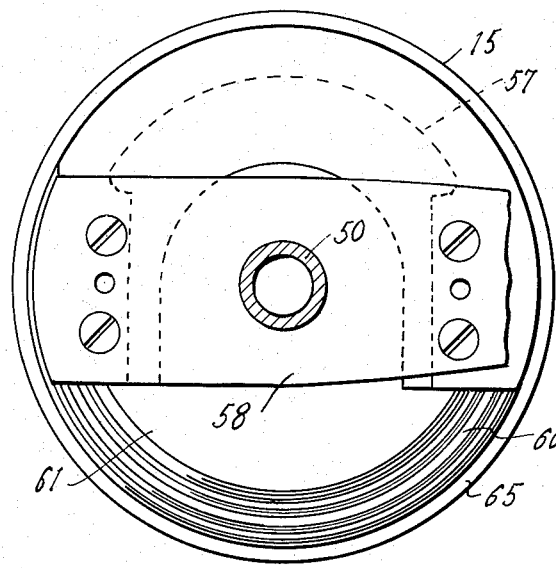

April 17, 1956
P. H. DIFFENBAUGH
2,741,956
MACHINES FOR MAKING BAGS, ENVELOPES
OR SIMILAR CONTAINERS
Filed Aug. 12, 1950
4 Sheets-Sheet 1
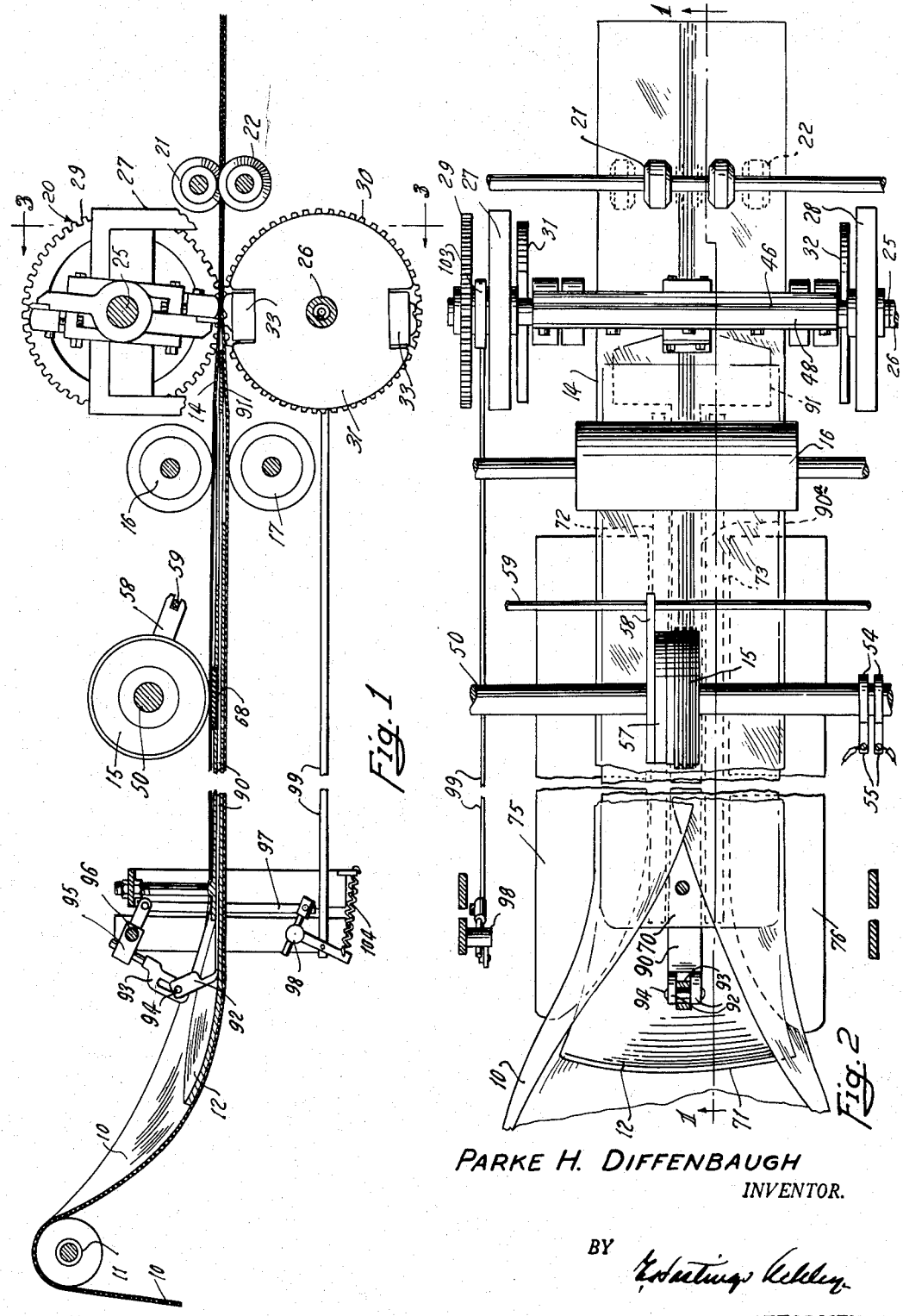
PARKE H. DIFFENBAUGH
INVENTOR.
BY *Edwings Kelley*
ATTORNEY April 17, 1956
P. H. DIFFENBAUGH
2,741,956
MACHINES FOR MAKING BAGS, ENVELOPES
OR SIMILAR CONTAINERS
Filed Aug. 12, 1950
4 Sheets-Sheet 2
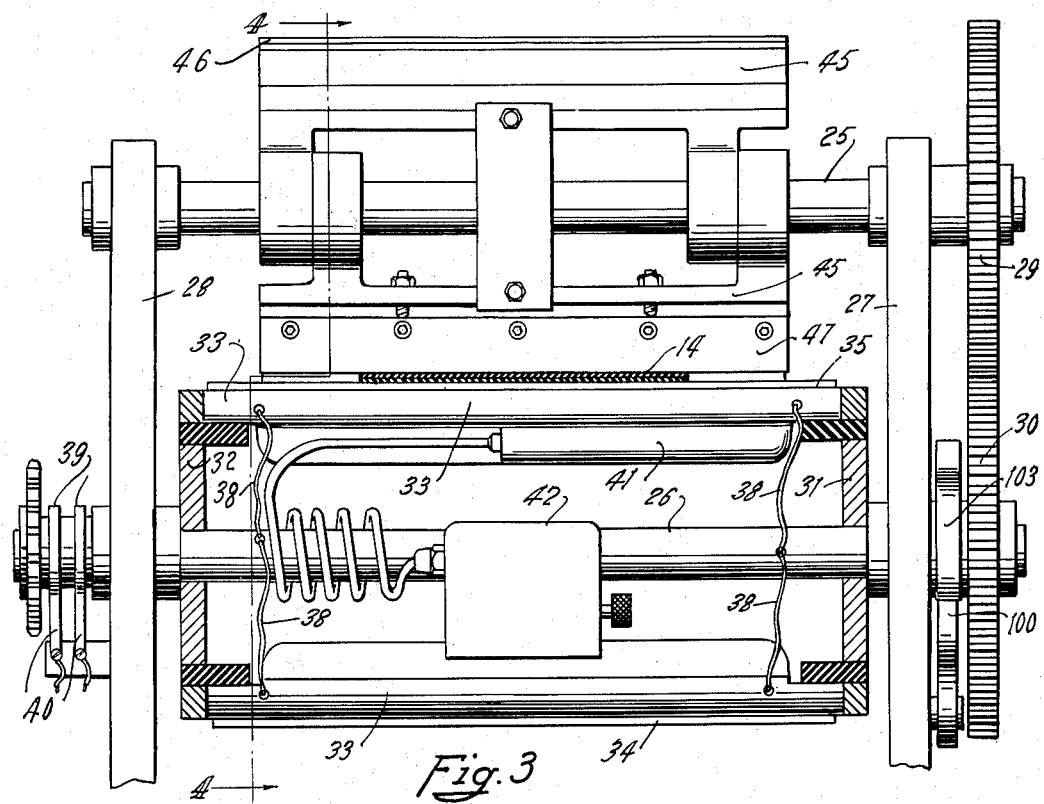
Fig. 3
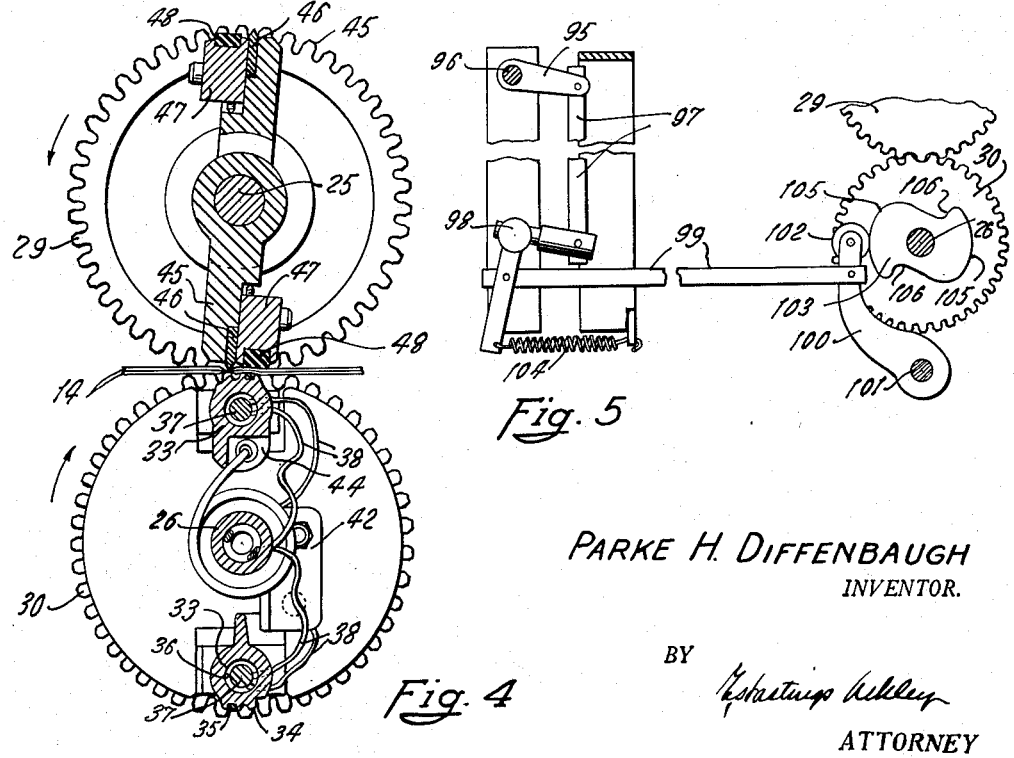
Fig. 4
Fig. 5
PARKE H. DIFFENBAUGH
INVENTOR.
BY
ATTORNEY April 17, 1956 P. H. DIFFENBAUGH 2,741,956
MACHINES FOR MAKING BAGS, ENVELOPES
OR SIMILAR CONTAINERS
Filed Aug. 12, 1950 4 Sheets-Sheet 3

PARKE H. DIFFENBAUGH
INVENTOR.

BY

ATTORNEY

April 17, 1956   P. H. DIFFENBAUGH   2,741,956
MACHINES FOR MAKING BAGS, ENVELOPES
OR SIMILAR CONTAINERS Filed Aug. 12, 1950   4 Sheets-Sheet 4

PARKE H. DIFFENBAUGH
INVENTOR.

BY

ATTORNEY

United States Patent Office 2,741,956
Patented Apr. 17, 1956

2,741,956

MACHINES FOR MAKING BAGS, ENVELOPES OR SIMILAR CONTAINERS

Parke H. Diffenbaugh, Dallas, Tex., assignor to Frank Hamachek Machine Company, Kewaunee, Wis., a corporation of Wisconsin Application August 12, 1950, Serial No. 179,036

3 Claims. (Cl. 93—8)

This invention relates to machines for making bags, envelopes or similar containers from thin, flexible, moisture-proof material wherein all seams are sealed or secured together by the application of heat.

One object of the invention is to provide a bag-making machine wherein an elongate sheet of thin, flexible material is continuously fed through the machine, folded to form a continuous longitudinal seam, and cut into sections sealed transversely at one end by rotary sealing and cutting means.

A particular object of the invention is to provide a bag-making machine having means provided therein for positively opening one end of the container, bag or envelope formed by the machine to facilitate access to the interior thereof.

Another object of the invention is to provide in a bag-making machine an improved continuous longitudinal sealing member for joining the enfolded side edges of the long strip of thin flexible material to form the longitudinal seam closing the material into a tube which is subsequently cut into sections of predetermined desired length.

A further object of the invention is to provide in a bag-making machine an improved rotary transverse sealing and cut-off mechanism, whereby the machine may be operated at high speeds and with a smoothness not attainable with reciprocating sealing and cutting mechanisms.

A particular object of the invention is to provide in a bag-making machine of the character described a reciprocable member which is operable to open or positively separate the ends of the sealed tube of material from which the previously cut section has been severed, whereby one end of the section severed from the tube is open, said reciprocable member when retracted permitting the sealing and cutting mechanism to seal and cut a subsequent section from the tube to form an envelope or container closed at one end and open at the other.

A further object of the invention is to provide an improved bag-making machine wherein a plurality of cutting and sealing members are mounted on rotating shafts and timed to cooperate with each other to seal and cut off sections of the formed tube, whereby bags of minimum lengths may be made by the machine at high rates of speed.

Still another object of the invention is to provide in a machine of the character described an improved mounting for the sealing mechanism, which is arranged to permit longitudinal expansion of the heated sealing bars without deforming the same out of proper sealing position.

A still further object of the invention is to provide in a machine of the character described sealing bars for forming a "crimped" transverse or bottom seal with a rotary motion, said bars having means for assuring matching of the crimp-forming sealing serrations.

Figure 8:
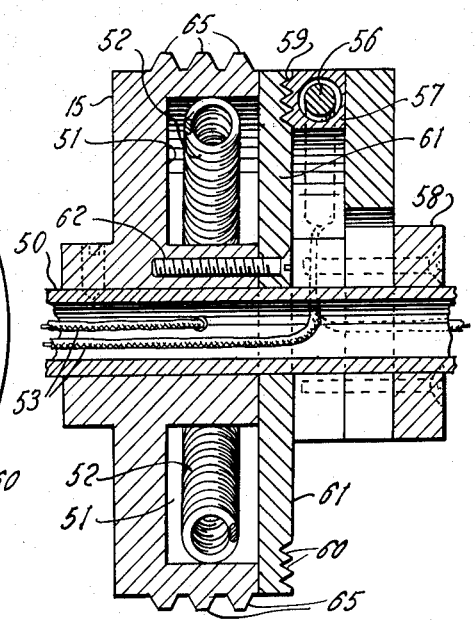
Figure 6:
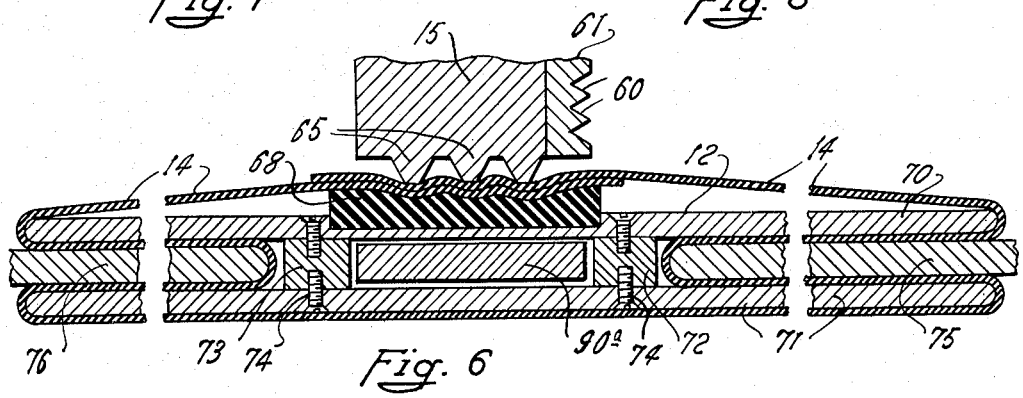
Figure 9:
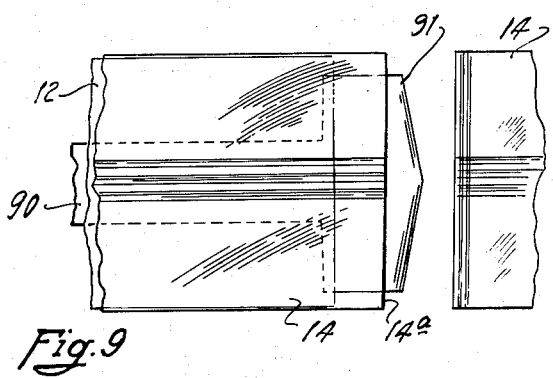
Figure 10:
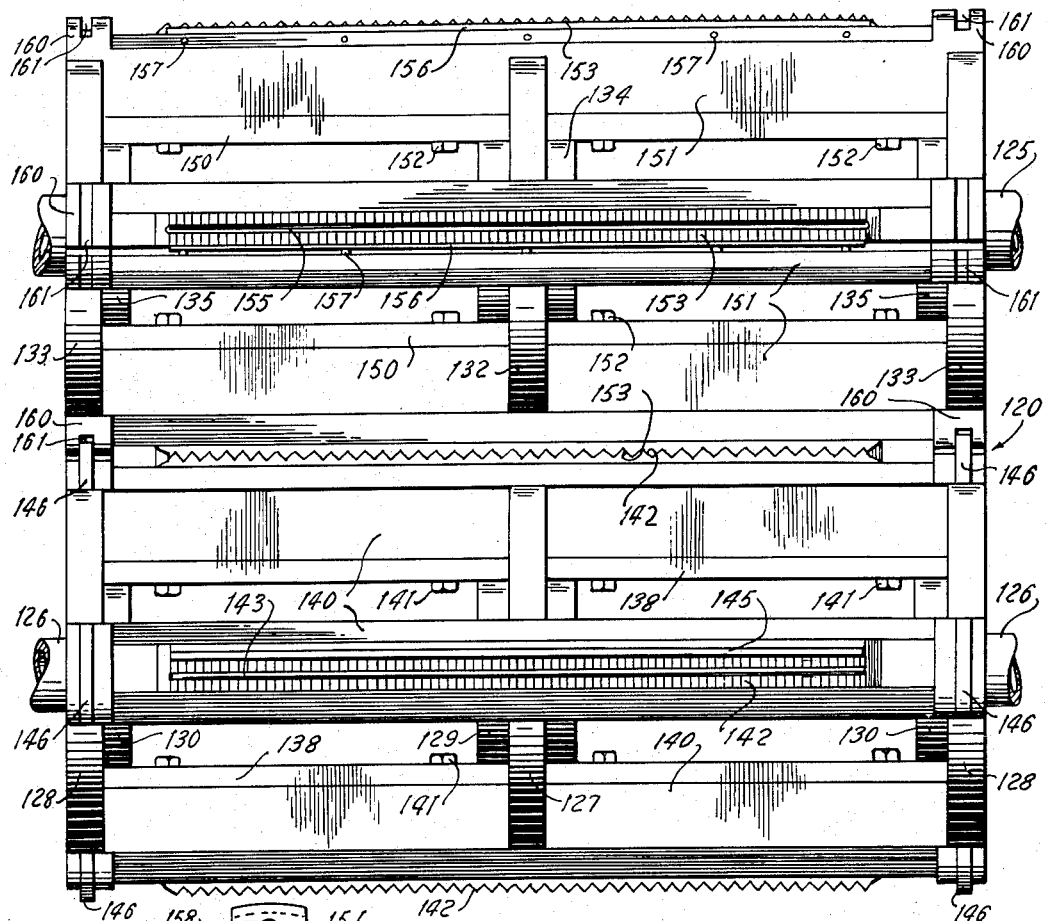
Figure 11:
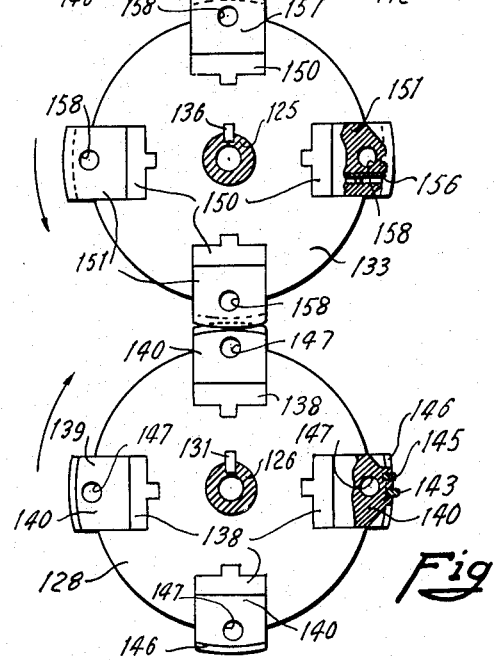

Additional objects and advantages of the invention will readily be apparent from the reading of the following description of a device constructed in accordance with the invention, and reference to the accompanying drawings thereof, wherein:

Figure 1 is a fragmentary longitudinal sectional view of a bag-making machine embodying the invention, Figure 2 is a fragmentary top plan view of the machine of Figure 1, Figure 3 is an enlarged transverse vertical sectional view taken on the line 3—3 of Figure 1 and showing the cutting and sealing mechanism, Figure 4 is a transverse vertical sectional view taken on the line 4—4 of Figure 3, Figure 5 is a fragmentary side elevation showing the cam and lever mechanism for operating the bag-opening member, Figure 6 is an enlarged fragmentary transverse vertical sectional view taken through the bag-folding mechanism at the longitudinal central sealing member, Figure 7 is an enlarged side elevation of the longitudinal sealing member, Figure 8 is a transverse vertical sectional view taken through the center of the central sealing member of Figure 7, Figure 9 is a fragmentary schematic plan view of the bag-opening member, showing the same in position opening the end of the tubular strip after a bag has been cut from said strip, Figure 10 is an enlarged front elevation of a modified form of sealing and cutting mechanism for forming a transverse crimp seal closing the bag bottom, and Figure 11 is a reduced side view, partly in section, of the sealing and cutting mechanism of Figure 10.

In the drawings, the numeral 10 designates an elongate strip of thin flexible thermo-plastic sheet material, which may be a cellulose product or a chlorinated rubber product or similar thermoplastic material. The elongate strip is unwound from a roll (not shown), and extends from such roll over a guide roll 11 and then under a folder 12, wherein the sides are infolded so that their edges overlap slightly and may be sealed together to provide an elongate tubular form. The overlapping edges are joined by a longitudinal heat-sealing member 15, and the tube so formed is drawn along the folder member by a pair of feed rollers 16 and 17 in the conventional manner.

The feed rollers 16 and 17 feed the tubular formed sheet 14 to a sealing and cutting mechanism 20 which forms a transverse heat seal, closing the tube at that point, and cuts off the section of the tubular material 14 adjacent the seal to form the bag, envelope or similar container. The formed container may then pass between a pair of ejecting rollers 21 and 22 which positively remove the formed container from the sealing and cutting mechanism and deposit the same in a suitable receptacle (not shown) or otherwise dispose of the same.

The sealing and cut-off mechanism 20 includes a pair of vertically spaced shafts, an upper shaft 25 and a lower shaft 26 mounted in the side frame members 27 and 28 of the machine, and geared together by means of a pair of gears 29 and 30 carried by the shafts 25 and 26 respectively and meshing so that the shafts rotate at the same speed in opposite directions.

Mounted on the lower shaft 26 are a pair of discs 31 and 32 which carry a pair of diametrically opposed heater and cut-off bars 33 which are rigidly fixed at their ends to the discs. Each heater and cut-off bar has an anvil 34 of hardened metal and a heated sealing surface 35 parallel to and spaced from the anvil. The bars 33 are provided with axial bores 36 in which are mounted an elongate rod-like heating member 37 connected by wires 38 to a pair of spaced electrical contact wiping rings 39 mounted on the outer end of the lower shaft 26. Brushes 40 contact the rings to conduct electrical energy from a suitable source of electric power to the rings and the wires connected thereto for energizing the heating element. One of the heater and cut-off bars 33 has mounted therein a thermocouple tube 41 which is connected with a thermostat 42 for controlling the electrical energy supplied to the heating element to assure maintaining the sealing surfaces 35 at proper sealing temperature.

Mounted on the upper shaft 25 are a pair of diametrically opposed carrier bars 45 each of which carries an elongate cut-off knife 46 and a sealing pad support 47 having a resilient sealing pad 48 mounted thereon and disposed to cooperate with the sealing surface 35 of the heater bar 33 to form a transverse seal across the tubular formed sheet material 14. The cut-off knives 46 are also disposed to cooperate with the anvils 34 to sever a section of the tubular formed sheet material adjacent the transverse seal formed by the sealing surface and sealing pads. Thus, as the shafts 25 and 26 rotate, in the direction indicated by the arrows in Figure 4, the resilient sealing pad 48 is positioned closely above the sealing surface 35 on the sealing bar 33 and the tubular sheet material 14 is compressed therebetween and heat-sealed to close the tube at that point. And, as the shafts further rotate, the anvil 34 and cut-off knives 45 are turned into juxtaposition so that the cutting edge of the knife contacts the surface of the anvil and severs a section of the tubular sheet material immediately adjacent the transverse seal just formed.

Upon continued rotation of the shafts 25 and 26, the heater bar 33 and the cutter bar 45 are swung apart, and the feed rollers 16 and 17 continue to move the tubular formed sheet material outwardly between the shafts until the diametrically opposed heater bar 33 and cutter bar 45 are swung into position to form a subsequent transverse seal and cut off another section of the tubular strip.

It will be seen therefore that the rotary sealing and cutting mechanism forms a bottom seal transversely of the tube and cuts off a section of the tube adjacent the seal as the tubular strip is moved outwardly by the feed rollers. There is no interruption in movement of the tubular strip, since the sealing and cutting mechanism rotates in the same direction as the strip is moved and forms the seal and cuts off a section of the strip as the same moves longitudinally through the sealing and cutting mechanism. Obviously, the number of sealing bars 33 and cutter bars 45 may be varied from one to a considerably greater number, whereby the number of bags or containers formed during each rotation of the shafts 25 and 26 may be varied, and whereby bags of minimum length may be produced by the machine.

The cut off sections of strip may then be pulled or moved outwardly from the sealing and cutting mechanism by the ejecting rolls 21 and 22 and deposited in a suitable receptacle or on a conveyor belt, or for disposal in any suitable manner.

The overlapping edge portions of the infolded strip of sheet material are sealed or joined together by a heat-applying sealer roller 15 which is rotatably mounted on a shaft 50. The sealer roller is provided with an internal annular recess 51, in which is mounted an annular heating element 52 connected by means of conductor wires 53 with a suitable source of electric power. The conductor wires extend inwardly from the heater element to an axial bore in the shaft 50 and outwardly through said bore to contact electrical contact rings 54 mounted on the outer end of the shaft and engaged by brushes 55 which are connected with the source of electrical power (not shown).

A temperature controlling thermocouple (not shown) is connected with a thermocouple element 56 carried by a contact wiper sector 57 mounted on the shaft 50 held against rotation by a restraining arm 58 which is slidably connected at its outer end to a transverse shaft 59 carried by the frame of the bag machine. The wiper sector is provided with a plurality of arcuate thread-like contact points 57a which mesh with complementary thread-like annular grooves 60 formed in the outer surface of a side plate 61 affixed to the roller sealer by screws 62, so that the heat of the sealer roller will be transferred through the side plate 61 to the wiper sector 57 and the thermocouple 56 carried thereby. Thus, the thermocouple is in continuous heat-transferring contact with the sealer roller, and the thermostat (not shown) will function to control the electrical energy furnished to the heater element 52 which heats the sealer roller to assure the proper heat-sealing temperature at the roller.

The sealer roller is shown as having a plurality of annular rib sealing surfaces 65 formed thereon, as clearly shown in Figure 8. However, the sealing surface 65 of the sealer roller may be provided with only one or any other desired number of circumferential ribs which will form continuous spaced lines joining the overlapping edges of the infolded sheet material. A pad 68 of resilient material, such as synthetic rubber or the like, is preferably covered by a sheathing of fabric, and is carried by the folder 12. The pad 68 is positioned on the folder beneath the sealer roller 15, whereby the sealing surfaces 65 of the roller compress the overlapping edges of the sheet material therebetween in the manner shown in Figure 6 to apply heat and pressure to such overlapping edges to heat-seal or join the same together to form the tubular strip 14 of sheet material.

If desired, the tubular strip of sheet material may be so folded as to form a bellows-type strip having re-entrant folded side walls as shown in Figure 6. To accomplish this, the folder 12 is provided with a pair of spaced plates 70 and 71, which are held in spaced relationship by a pair of spacer bars 72 and 73 secured between the plates 70 and 71 by screws 74 or the like. A pair of re-entrant folder fingers 75 and 76 are positioned in the space between the upper plate 70 and the lower plate 71 of the folder, and the strip of sheet material is thus formed in a tube, having re-entrant bellows folds at its side edges in the usual manner, by the fingers 75 and 76 and the spaced plates 70 and 71. Of course, the tubular strip may be formed without the bellows-type re-entrant sides by omitting the fingers 75 and 76 so that no re-entrant fold is formed at the sides of the tubular strip.

As the sections of tubular strip are cut off by the sealing and cutting mechanism 20, it frequently happens that the edges of the material at the cut end of the strip tend to adhere together and to resist ready opening. This condition may be aggravated somewhat by the heat applied to the strip through the anvil section 34 of the heater bar 33, which is in heat-exchanging contact with the remainder of the heater bar. Thus, there is a tendency to effect a semi-seal of the end sections of the tubular strip as the sections or containers are severed therefrom.

To provide for positively re-opening or separating the ends of the tubular strip after the strip has been cut by the cut-off knife, a reciprocating opener blade 90 is slidably mounted on the folder 12 and has a thin flat plate 91 at its outer end near the sealing and cutting mechanism 20, the plate being moved outwardly beyond the cut-off end of the tubular strip 14 immediately after the cut-off blade and anvil have been turned past cutting position, so that the outer end of the blade is moved through and separates the adhering severed ends 14a of the tubular strip. The blade is then withdrawn from between the shafts 25 and 26 and the tubular strip continues to move outwardly until the next set of cut-off knives and anvil has been turned by the shaft to sever a successive section of tubular material from the strip, whereupon the blade is again moved outwardly within the tubular strip to assure separation of the severed ends and again withdrawn from between the shafts to permit a successive sealing and cutting operation to be carried out.

The outer end of the separator blade is formed with a central point and slightly rearwardly sloping side edges, so that the central point first passes between the severed edges of the strip and the tapered sides then move through the end of the strip to separate the remainder of the severed end. The reciprocating member has a reduced portion or shank 90a extending from the head back through the folder between the upper plate 70 and the lower plate 71 and disposed between the separator plates or bars 72 and 73, as clearly shown in Figures 2 and 6. The extreme rear end of the shank is turned upwardly and provided with a pair of spaced arms 92 between which an elongate slotted lever arm 93 is positioned. A pin 94 extends between the spaced legs on the inner end of the reciprocating opener bar and through the slot in the lever arm, as clearly shown in Figures 1 and 2, so that, as the lever arm 93 is swung, the opener member is moved longitudinally of the folder and the tubular strip 14 formed thereby. The lever arm is connected to a rocker arm 96 mounted on a shaft 96 carried by the frame of the bag machine, and the opposite end of the rocker arm is connected with a push rod 97 which has its lower end connected to one arm of a crank 98 mounted on the frame below the folder, as best shown in Figure 1. The other arm of the crank is connected with an elongate horizontally extending rod 99 which extends outwardly from the crank to a lever arm 100 mounted at one end on a stub-shaft 101 carried by the frame of the bag machine and having a cam-follower roller 102 at its outer movable end.

The follower-roller rides on a cam 103, mounted on the lower shaft 26 of the sealing and cutting mechanism 20 and turning with said shaft. A tension spring 104 has one end connected to the frame of the machine and its other end connected to the arm of the crank carrying the horizontally extending rod 99, whereby said spring exerts its force to urge the rod toward the cam 103 to cause the follower 102 to ride the cam closely. The cam surface is formed in substantially the shape of a reverse S having opposed lobes 105 which move the rod 99 rearwardly and, acting through the push rod 97, rocker arm 95 and lever arm 93, move the reciprocating opener bar 90 rearwardly to withdraw the head 91 from between the cutting and sealing members. However, when the follower 102 enters the hollows 106 of the cam, it will be seen that the spring 104 swings the crank arm 98 to lift the push rod 97 and swing the rocker arm 95 and the lever arm 93 to move the opener bar outwardly between the shafts 25 and 26, to open the end of the tubular strip in the manner already explained.

Obviously, other mechanisms than the linkage mechanism shown may be used for operating the reciprocating opener bar, so long as movement of the opener bar is timed properly with respect to the operation of the sealing and cutting members.

If desired, the transverse seal formed for closing the bottom end of the bag may be in the form of a "crimped" seal. While there have been reciprocating apparatuses used for forming transverse "crimped" seals, this bag machine is adapted to have a rotary "crimp" sealer and cutting mechanism incorporated therein, and such a sealing and cutting mechanism is illustrated in Figures 10 and 11.

The sealing and cut-off mechanism 120 includes a pair of vertically spaced shafts similar to the shafts 25 and 26 of the form previously described. The upper shaft 125 and lower shaft 126 are mounted in the side frame members of the machine and geared together by a pair of gears (not shown) carried by the ends of the shafts and meshing so that the shafts rotate at the same speed in opposite directions in the same manner as the elements of the sealing and cutting mechanism 20 previously described. Mounted on the lower shaft 126 are three spaced discs or plate members, a central plate 127 and two side or end plates 128. The central plate has a hub 129 which is fixed by a pin or set screw (not shown) to the central part of the lower shaft 126, while the end plates 128 each have an inturned hub or boss 130 which is provided with a key-way receiving a key 131 by means of which the end plates are keyed on the shaft so as to be driven thereby but may be moved slightly longitudinally of the shaft, for a purpose which will be hereinafter more fully explained.

The upper shaft 125 is provided with a central disc 132 and a pair of spaced end discs or plates 133 which are substantially identical to the central plate 127 and the end plates 128 mounted on the lower shaft. The upper central plate 132 has a hub 134 which is secured by a pin or set screw (not shown) to the central portion of the upper shaft 125 so as to be held against movement on said shaft. The end plates 133 are provided with bosses or hubs 135 which have key-ways receiving a key 136 whereby the end plates are keyed to the shaft and will be rotated thereby but may move slightly longitudinally of the shaft, for a purpose which will be hereinafter more fully explained.

A plurality of elongate base plates or bars 138 are fixed in radial recesses or notches 139 formed in the center and end plates 127 and 128, said base bars 138 being affixed to said discs or plates by welding or otherwise. These base bars or plates are adapted to receive and support a plurality of heating and cut-off bar members 140 which are removably secured to the plates by bolts 141. Each heating and cut-off bar 140 has a serrated sealing surface 142 formed longitudinally thereon parallel to the axis of the shaft 126. As shown, this serrated sealing surface is provided with an elongate dividing bar 143 centrally of the serrations of said sealing surface and extending longitudinally throughout said surface. The bars 140 also each have a hardened metal anvil strip 145 secured therein parallel to and at the edge of the sealing surface.

At the outer end of each bar 140 are formed narrow flange or tongue members 146 which are used for a purpose which will be hereinafter more fully explained. The bars 140 are provided with longitudinally extending bores 147 in which are mounted elongate rod-like heating elements similar to the heating elements 37 of the form first described. The elements are connected by wires (not shown) which lead from the elements to contact rings and brushes (not shown) at the end of the shaft 126 whereby electrical energy may be supplied to the heating elements for heating the sealing surfaces of the bars.

The upper center plate 132 and end plates 133 have a plurality of elongate base bars 150 secured by welding or otherwise within radially extending recesses or notches 151 formed in the plate, in the same manner as the base bars 138 of the lower section of the heating and cutting assembly. These base plates 150 receive and support upper heating and cut-off bars 151 which are complementary to the lower heating and cut-off bars 140, and which are secured to the base bars by means of bolts 152. These upper sealing and cutting bars are also provided with serrated sealing surfaces 153 which intermesh with the sealing surfaces 142 of the lower heating and cutting bars 140 in the manner shown in Figure 10, whereby a crimp seal is formed in the plastic material extending between the members. The serrated sealing surface 153 of the upper bars is formed with an elongate longitudinally extending central recess or groove 155 for receiving the dividing bar 143 of the lower sealing and cutting bar. This provides for a pair of spaced crimped sealing lines and also helps to draw the plastic material taut along the serrated surfaces.

Each upper sealing and cutter bar 151 has an elongate cutting knife 156 releasably secured by screws 157 in a slot provided in the bar, and the cutting edge of this cutter bar is disposed to engage the hardened anvil 145 of the lower sealing and cutter bars, so that as the members are rotated, in the direction of the arrows of Figure 11, the cutting edge of the knife contacts the surface of the anvil and severs a section of the tubular sheet material passing therebetween immediately adjacent the transverse seal just formed by the serrated sealing surfaces.

Each of the upper sealing members is also provided with a longitudinally extending bore 158 for receiving and holding an elongate rod-like heating member (not shown) similar to the heating member 37 of the form first described, which is connected by lead wires extending outwardly to contact rings and brushes (not shown) on the outer end of the shaft for conducting electrical energy to the heating elements for heating the bars and the serrated sealing surfaces thereon.

Each of the upper heating and cutting bars 151 is provided with a flange 160 at its ends, and each flange has a groove 161 formed therein for receiving the rib or tongue 146 of the lower bars, whereby the upper and lower heating and sealing members are properly positioned with respect to each other and the serrated sealing surfaces brought into mesh as the bars are turned. It will be noted that the ribs 146 and the grooves or slots 161 engage each other prior to the engagement of the serrated sealing surfaces, since the flanges on the upper and lower members are wider than the serrated sealing surface on such members. Thus, the serrated sealing surfaces are properly positioned with respect to each other prior to being brought into sealing contact with each other as the heating mechanism turns.

Due to the heat applied to the sealing members, there will be an elongation of such members. However, since the central discs or plates 127 and 132 are each secured to the shafts 126 and 125 respectively, and since the end plates 128 and 133 respectively are movable longitudinally of the shafts 126 and 125, it will be seen that the elongation of the sealing and cutting bars due to the increase in temperature will not cause the sealing surfaces of such bars to buckle or be deformed out of proper alignment on the shaft. The end portions of the bars may expand in length and move the end plates outwardly on the shaft as the bars expand. The engagement of the guide ribs 146 of the lower members in the grooves 161 of the upper members will bring the serrated sealing surfaces of such members into correct meshing sealing engagement regardless of the lateral position of the sealing and cutting bars on the shaft.

Obviously, this means of providing for maintaining the sealing and cutting bars in proper alignment in spite of elongation due to heating would be equally applicable to the form of the device previously described, since the upper section of the sealing and cutting mechanism 20 could be provided with sealing and cutting bars having a smooth sealing surface instead of the serrated surface which formed the crimp cut.

The serrated sealing surfaces of the sealing and cutting bars are cut on a radius about the axis of the shafts on which the members rotate, the outer edges of such serrated sealing surfaces being formed with a slightly shorter radius than the remainder of the surface to facilitate entry of the plastic material therebetween and to reduce the likelihood of cutting the material during the sealing operation.

From the foregoing, it will be seen that an improved machine for making bags, envelopes or similar containers from thin flexible moisture-proof material where all seams are sealed or secured together by the application of heat has been provided. The machine is particularly adapted to feed an elongate sheet of the thin flexible material continuously through the machine, to fold the sheet to form a tubular strip having a continuous longitudinal seam, and to form transverse seals and cut the tubular strip into sections adjacent the transverse seal to form the bag; all of such operations being carried out by rotary sealing and cutting means whereby movement of the material through the machine is not interrupted and the bags may be formed at high speeds.

It will particularly be noted that the machine has been provided with means for positively opening one end of the container, bag or envelope formed by the machine to positively assure separation of the material of the open end of the sealed tube of material of which the bag is formed, whereby the envelope or container is closed at one end and open at the other and it is assured that the open end is open.

By providing rotary sealing and cut-off mechanisms, the machine may be operated at high speeds and with a smoothness not attainable with reciprocating cutting and sealing mechanisms. Also, by varying the speed of the feeding or drawing rolls with respect to the speed of the sealing and cutting mechanisms, the length of the bag, envelope or container formed by the machine may be controlled. Also, by providing a plurality of sealing and cutting members on the rotating shaft timed to coordinate with each other, it will be seen that bags of minimum lengths may be made by the machine at high rates of speed.

Furthermore, it will be seen that the machine is adapted to form crimp seals with a rotary motion, whereby crimp-bottom bags may be formed at high speeds.

It is also important to note that means has been provided in the sealing and cutting mechanism for compensating for the elongation of the sealing members caused by the heat applied to such members, whereby the members are maintained in an undistorted or unbuckled position to provide for a smooth accurate transverse seal.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A bag-making machine including, a frame, an elongate forming mandrel carried by said frame, means for feeding an elongate continuous strip of sheet heat-sealable bag material longitudinally of said mandrel, folder means infolding the opposite edge portions of said sheet of bag material around said mandrel to overlap centrally, a rotatable heat-sealing member engaging the overlapped edges of the sheet of bag material for sealing the same longitudinally to form an elongate continuous tubular strip, a pair of spaced shafts geared to rotate together in opposite directions and between which the strip of tubular bag material is fed, complementary heating and cutter bars carried by each shaft and rotatable with said shafts and into juxtaposition beyond the end of the mandrel to press and heat-seal a transverse seal across the tubular strip, complementary cutter members carried by the shafts and engageable beyond the end of the mandrel as the shaft is rotated to sever the strip of tubular bag material at a point immediately to the rear of the transverse seal, a reciprocating opener member movable longitudinally of the mandrel in timed relation to the heating and cutting bars and projectable outwardly through the severed end of the tubular bag material for opening the severed end of the tubular material after the bag section has been cut therefrom and prior to the formation of a subsequent transverse seal, and a timing mechanism operatively connecting the reciprocating opener member with one of the shafts for timing the movement of the opener member with respect to rotation of the heating and cutter bars carried by said shafts, said timing mechanism moving said opener to assure opening of the severed end of the tubular bag material while the strip of tubular bag material is moving and between sealing and cutting operations.

2. A bag machine including: means for feeding a strip of bag-making material in tubular form; means for forming a transverse seal across said tubular form at a point spaced from the end of said strip of tubular form; means for cutting said tubular form adjacent and immediately rearward of said transverse seal, whereby said cut off sealed section of tubular form forms a bag; and reciprocating means operable in timed relation to the means for forming the transverse seal and the means for cutting the tubular form and projectable through the end of the strip of tubular form after the bag section has been cut off to assure that the forward end of the tubular form is open.

3. A bag making machine including: means for continuously feeding a sheet of bag material in tubular form; means for successively forming a transverse seal across said tubular form at points spaced from the forward end of said strip of tubular form as said tubular form is continuously fed; means for successively cutting said strip of tubular form transversely adjacent and immediately rearward of said transverse seal, whereby the cut off sections each form a bag; and reciprocating means operable in timed relation to the means for forming the transverse seal and the means for cutting the tubular form and projectable through the end of the strip of tubular form while the same is being fed after a section has been cut off and before the next successive seal is formed, to assure that the forward end of said tubular form is open.

References Cited in the file of this patent

UNITED STATES PATENTS

| Number | Name | Date |
|---|---|---|
| 2,205,005 | Anderson | June 18, 1940 |
| 2,227,497 | Hallman | Jan. 7, 1941 |
| 2,275,976 | Mead | Mar. 10, 1942 |
| 2,340,510 | Corley | Feb. 1, 1944 |
| 2,347,902 | Gaubert | May 2, 1944 |
| 2,362,460 | Barnett | Nov. 14, 1944 |
| 2,490,930 | Thompson | Dec. 13, 1949 |
| 2,532,784 | Reitzes | Dec. 5, 1950 |
| 2,577,386 | Vergobbi | Dec. 4, 1951 |